Patented Feb. 16, 1943

2,311,609

UNITED STATES PATENT OFFICE 2,311,609

HOT-MELT COATING COMPOSITION

Toivo A. Kauppi and Myron Kin, Midland, Mich., assignors to The Dow Chemical Company, Midland, Mich., a corporation of Michigan No Drawing. Application April 23, 1940,
Serial No. 331,212

6 Claims. (Cl. 260—14)

This invention relates to low viscosity type hot-melt compositions comprising organo-soluble, lower alkyl ethers of cellulose, a mineral wax and an ester wax.

In the co-pending applications of one of the present inventors and others, Serial Nos. 198,832 and 273,965, hot-melt compositions are described which are suitable for application by the customary wax coating machine. These compositions comprise, respectively

|  | Per cent by weight | |
|---|---|---|
| Water-insoluble lower alkyl ether of cellulose wherein the alkyl radicals contain from 1–4 carbon atoms inclusive | 5–20 | 5–20 |
| Ester wax, i. e. oxygen-containing waxy bodies | 30–80 | 25–55 |
| Compatible plasticizer | 5–20 | 0 |
| Mineral wax | 5–30 | 15–30 |
| Compatible, non-oxidizing non-setting resin | 0–30 | 15–40 |

Both types of composition contain minor proportions of cellulose ether. Both have viscosities of less than 3000 centipoises at 100° C. and are suitable for application by means of the customary wax coating machines at temperatures lying between about 90° C. and 110° C. They are typical of the hot-melt coating compositions to which the present invention is applicable.

In the course of extensive work on the coating of paper, structureless cellulosic films and thermoplastic cellulose derivative films and other sheet materials, with low viscosity type hot-melt compositions, it has been found that those melts having the lowest viscosities at the coating temperature are the ones which are the most satisfactorily applied by means of wax-coating machines. This is especially true of thermoplastic films which stretch and distort with heat when under tension on a coating machine. It has also been found that hot-melt compositions tend to darken slightly when kept in a molten condition for long periods, for example, 10 to 20 hours, as they may be during the commercial production of hot-melt coated paper and the like. This darkening is more pronounced when the low viscosity type hot melt contains one or more of the less color-stable resins, for example, the pure phenolic resins.

It is accordingly an object of this invention to prepare low viscosity type hot melts comprising a lower alkyl ether of cellulose, a mineral wax and an ester wax having the lowest possible viscosities at the temperatures which are employed for applying the said melts. A further object is to prepare low viscosity type hot melts of the type aforesaid of improved color stability on heating.

These and related objects are attained by incorporating as a constituent of low viscosity type hot melts, between 1 and 20 per cent (based on the total weight of the melt) of hydrogenated rosin which acts as a viscosity reducing agent. The presence of this material also retards the rate of darkening of hot melts on continued heating.

Whereas the stated proportions of 1 to 20 per cent are allowable limits, it is preferred to use between 3 and 7 per cent of hydrogenated rosin. These amounts may be added to any particular hot-melt formulation at the expense of the resin or plasticizer ingredient, or both, without affecting appreciably the properties of the applied hot-melt coating. Quantities of hydrogenated rosin larger than 7 per cent should only be used in formulations which call for larger quantities of resin, such as some of those described in the aforesaid co-pending application Serial No. 273,965. Here, hydrogenated rosin may suitably replace part, or all, of the necessary resin ingredient.

In carrying out our invention, the wax, resin, and plasticizer constituents of a low viscosity type hot melt are melted together with a suitable quantity of hydrogenated rosin. The mixture is maintained in a molten condition at say 150° C. while a quantity of an organo-soluble, lower alkyl ether of cellulose is stirred in until it is dissolved. The melt is then ready for application.

Suitable hydrogenated rosin for use in the present invention is that sold under the registered trade-mark "Staybelite." The preparation and properties of this material is described in U. S. Patent No. 2,113,808.

The following examples illustrate the practice of the invention, but are not to be construed as limiting, as they are given purely by way of illustration:

Example 1

A hot melt was prepared having the composition:

| | Parts by weight |
|---|---|
| Ethyl cellulose, 10 centipoise type | 10 |
| 12-hydroxy stearin | 39 |
| Paraffin wax, M. P. above 60° C. | 28 |
| Super Beckacite 2000 (a phenolic resin) | 13 |
| Staybelite A-1 | 5 |
| Cyclohexyl diphenyl oxide of type defined in U. S. Patent No. 2,189,337 | 5 |

This melt was made by heating together the resin, wax and plasticizer constituents at 150° C. then stirring in the ethyl cellulose till dissolved. The melt was cooled to 105° C. when its viscosity was measured. The measured viscosity was 465 centipoises. A similar melt containing no Staybelite resin but containing 10 per cent of cyclohexyl diphenyl oxide was prepared. Its viscosity at 105° C. approximated 1000 centipoises.

The melt containing Staybelite A-1 resin was easy to apply using a wax coating machine, and gave a coating on paper which had good gloss and low moisture permeability and which was non-blocking.

Example 2

A hot melt was prepared having the composition:

| | Parts by weight |
|---|---|
| Ethyl cellulose, 10 centipoise type | 10 |
| 12-hydroxy stearin | 44 |
| Paraffin wax, M. P. above 60° C. | 28 |
| Super Beckacite 2000 | 13 |
| Staybelite A-1 | 5 |

After heating at 140° C. for one hour, this melt had a viscosity of 584 centipoises at 105° C. The melt was found suitable (on account of its low viscosity) for coating thermoplastic films at temperatures sufficiently low to prevent wrinkling or distortion of the film.

Example 3

A hot melt was prepared having the composition:

| | Parts by weight |
|---|---|
| Ethyl cellulose, 10 centipoise type | 10 |
| 12-hydroxy stearin | 39 |
| Paraffin wax, melting point 135° C. | 28 |
| Super Beckacite 2000 | 13 |
| Cyclohexyl diphenyl oxide | 10 |

This melt was divided into two parts and a quantity of Staybelite A-1 resin amounting to about 1 per cent of the composition was added to one of the portions. The color of each portion was determined (while in a molten condition) both before and after heating for 21 hours at 130° C. The determination of color was made by comparison with Gardner color standards such as are described in "Physical and Chemical Examination of Paints, Varnishes, Lacquers and Colors" by H. A. Gardner, ninth edition, 1939, page 72. These color standards consist of 18 solutions of ferric chloride, of which No. 18 is the darkest. Each solution has ⅔ of the intensity of color of the next one above it in the series. The darkest color matches that of a solution of 3 grams of potassium dichromate in 100 cc. of sulphuric acid. Determinations of color values of any liquid are simply made by placing it in a tube similar to those holding the color standards and finding a match among the latter.

In the experiment now being described, both melts had a color value of 9½ prior to heating, but after 21 hours of heating at 130° C., that containing Staybelite resin had a color value of only 12, while the unmodified melt had a color value of 14.

The invention has been described with respect to ethyl cellulose as the lower alkyl ether of cellulose. Any organo-soluble, lower alkyl ether, where the alkyl group contains from 1 to 4 carbon atoms, may be used in the place of ethyl cellulose. As taught in the aforesaid two co-pending applications, resins other than those specifically disclosed hereinabove may be employed in melt compositions of the type here concerned. These include non-thermosetting resins of the alkyd type and of the phenol-formaldehyde type, as well as rosin, ester gum, dammar gum and like natural resins.

Other modes of applying the principle of our invention may be employed instead of those explained, change being made as regards the materials employed, provided the ingredients stated by any of the following claims or the equivalent of such stated ingredients be employed.

We therefore particularly point out and distinctly claim as our invention:

1. A hot-melt non-blocking coating composition, consisting of 100 parts of the following ingredients, each in a proportion to constitute a percentage of said 100 parts within the range recited below:

| | Per cent by weight |
|---|---|
| Lower alkyl ether of cellulose (alkyl contains 1 to 4 carbon atoms) | 25–20. |
| A wax selected from the group consisting of the true waxes, wax-like esters, and wax-like monohydric alcohols | 25–80. |
| Compatible, non-thermo setting resin | Not to exceed 40. |
| A plasticizer which is a solvent for the cellulose ether | Not to exceed 20. |
| Mineral wax | 5–30. | and from 1 to 20 per cent of hydrogenated rosin, based on the weight of the other ingredients, which composition is characterized by its low viscosity and good retention of color on prolonged heating at 130° C.

2. A hot-melt non-blocking coating composition, consisting of 100 parts of the following ingredients, each in a proportion to constitute a percentage of said 100 parts within the range recited below:

| | Per cent by weight |
|---|---|
| Ethyl cellulose | 5–20. |
| A wax selected from the group consisting of the true waxes, wax-like esters, and wax-like monohydric alcohols | 25–80. |
| Compatible, non-thermosetting resin | Not to exceed 40. |
| A plasticizer which is a solvent for the cellulose ether | Not to exceed 20. |
| Mineral wax | 5–30. | and from 3 to 7 per cent of hydrogenated rosin, based on the weight of the other ingredients, which composition is characterized by its low viscosity and good retention of color on prolonged heating at 130° C.

3. A hot-melt coating composition consisting of 100 parts of the following ingredients, each in a proportion to constitute a percentage of said 100 parts within the range recited below:

| | Per cent by weight |
|---|---|
| Ethyl cellulose | 5–20 |
| A wax selected from the group consisting of the true waxes, wax-like esters, and wax-like monohydric alcohols | 30–80 |
| A plasticizer which is a solvent for the cellulose ether | 5–20 |
| Mineral wax | 5–30 | and from 3 to 7 per cent of hydrogenated rosin, based on the weight of the other ingredients, which composition is characterized by its low viscosity and good retention of color on prolonged heating at 130° C.

4. A hot-melt coating composition consisting of 100 parts of the following ingredients, each in a proportion to constitute a percentage of said 100 parts within the range recited below:

| | Per cent by weight |
|---|---|
| Ethyl cellulose | 5–20 |
| A wax selected from the group consisting of the true waxes, wax-like esters, and wax-like monohydric alcohols | 25–55 |
| Compatible, non-thermosetting resin | 15–40 |
| Mineral wax | 15–30 | and from 3 to 7 per cent of hydrogenated rosin, based on the weight of the other ingredients, which composition is characterized by its low viscosity at coating temperatures and good retention of color on prolonged heating at 130° C.

5. A hot-melt non-blocking coating composition, consisting of 100 parts of the following ingredients, each in a proportion to constitute a percentage of said 100 parts within the range recited below:

| | Per cent by weight |
|---|---|
| Ethyl cellulose, 10 centipoise type | 10 |
| 12-hydroxy stearin | 39 |
| Compatible non-thermosetting phenol-formaldehyde resin | 13 |
| Cyclohexyl diphenyl oxide plasticizer | 5 |
| Paraffin wax, M. P. above 60° C | 28 |
| Hydrogenated rosin | 5 | said composition being characterized by its low viscosity and good retention of color on prolonged heating at 130° C.

6. A hot-melt non-blocking coating composition, consisting of 100 parts of the following ingredients, each in a proportion to constitute a percentage of said 100 parts within the range recited below:

| | Per cent by weight |
|---|---|
| Ethyl cellulose, 10 centipoise type | 10 |
| 12-hydroxy stearin | 44 |
| Compatible non-thermosetting phenol-formaldehyde resin | 13 |
| Paraffin wax, M. P. above 60° C | 28 |
| Hydrogenated rosin | 5 | said composition being characterized by its low viscosity and good retention of color on prolonged heating at 130° C.

TOIVO A. KAUPPI.
MYRON KIN.

CERTIFICATE OF CORRECTION.

Patent No. 2,311,609.  February 16, 1943.

TOIVO A. KAUPPI, ET AL.

It is hereby certified that error appears in the printed specification of the above numbered patent requiring correction as follows: Page 2, second column, line 34, in the table, for "25-20" read --5-20--; and that the said Letters Patent should be read with this correction therein that the same may conform to the record of the case in the Patent Office.

Signed and sealed this 27th day of April, A. D. 1943.

(Seal)

Henry Van Arsdale,
Acting Commissioner of Patents.